(12) United States Patent  
Baarman et al.

(10) Patent No.: US 7,364,651 B2
(45) Date of Patent: Apr. 29, 2008

(54) REMOTELY CONTROLLABLE OUTLET FOR WATER TREATMENT SYSTEM

(75) Inventors: David W. Baarman, Fennville, MI (US); Andrew M. Clews, Grand Rapids, MI (US); Roy W. Kuennen, Caledonia, MI (US)

(73) Assignee: Access Business Group International, LLC, Ada, MI (US)

( * ) Notice: Subject to any disclaimer, the term of this patent is extended or adjusted under 35 U.S.C. 154(b) by 493 days.

(21) Appl. No.: 10/892,301

(22) Filed: Jul. 15, 2004

(65) Prior Publication Data

US 2006/0011526 A1  Jan. 19, 2006

(51) Int. Cl.
*B01D 17/12* (2006.01)

(52) U.S. Cl. .................. 210/143; 241/46.013; 340/3.1; 340/310.11; 340/310.16; 340/825; 340/870.01; 340/870.11

(58) Field of Classification Search .................. 210/85, 210/91, 97, 143; 241/46.01, 46.012, 46.013; 379/102.01; 340/660, 825, 870.01, 870.11, 340/3.1, 310.11; 700/22, 273, 275, 282
See application file for complete search history.

(56) References Cited

U.S. PATENT DOCUMENTS

| | | | |
|---|---|---|---|
| 3,440,347 A | 4/1969 | Spencer et al. | |
| 3,590,271 A | 6/1971 | Peters | |
| 4,200,862 A | 4/1980 | Campbell et al. | |
| 4,418,333 A | 11/1983 | Schwarzbach et al. | |
| 4,708,791 A | 11/1987 | Dillard, III | |
| 4,849,098 A | 7/1989 | Wilcock et al. | |
| 4,899,129 A * | 2/1990 | MacFadyen et al. ... | 340/310.11 |
| 5,434,561 A | 7/1995 | Greening et al. | |
| 5,435,909 A | 7/1995 | Burrows | |
| 5,527,450 A | 6/1996 | Burrows | |
| 5,580,444 A | 12/1996 | Burrows | |
| 5,731,664 A | 3/1998 | Posa | |
| 5,774,529 A | 6/1998 | Johannsen et al. | |
| 6,130,412 A | 10/2000 | Sizemore | |
| 6,299,775 B1 * | 10/2001 | Elston ........................ | 210/605 |
| 6,317,028 B1 * | 11/2001 | Valiulis ..................... | 340/10.1 |
| 6,826,267 B2 * | 11/2004 | Daum et al. ........... | 379/102.03 |
| 6,967,565 B2 * | 11/2005 | Lingemann ........... | 340/310.11 |
| 7,091,861 B2 * | 8/2006 | Schmidtberg et al. ... | 340/572.1 |
| 7,167,078 B2 * | 1/2007 | Pourchot ................... | 340/5.61 |

* cited by examiner

*Primary Examiner*—Joseph Drodge
(74) *Attorney, Agent, or Firm*—Warner Norcross & Judd

(57) ABSTRACT

A remote control system for providing control of an under-counter water treatment system and garbage disposal. The system includes a remote unit that is electrically connected to an existing switched, under-counter AC power outlet. The garbage disposal and water treatment system are connected to and receive power from the remote unit. The system further includes a control unit that is located above-counter and permits a user to control operation of the remote unit and consequently the garbage disposal and water treatment system. The two units may communicate wirelessly using communication signals that are tagged with a unique security code. In one embodiment, the system includes a microprocessor in each of the control unit and the remote unit, the microprocessor in the remote unit communicating the status of the water treatment system to the control unit and the microprocessor of the control unit appropriately displaying the information.

17 Claims, 3 Drawing Sheets

REMOTELY CONTROLLABLE OUTLET FOR WATER TREATMENT SYSTEM

BACKGROUND OF THE INVENTION

The present invention relates to water treatment systems and more specifically to remotely controllable water treatment systems.

Water treatment systems are commonly used to treat water prior to consumption or other use. The systems remove certain particulate matter and other contaminants from water. This is especially useful when the water will be used for human consumption because the systems can not only make water safer for drinking, but also improve the water's taste, odor, clarity and other aesthetic qualities of the water. Because the water available through the faucets in most homes contains a large number of contaminants, many homeowners install water treatment systems on their kitchen faucets to provide treated water for consumption or other uses. In many conventional systems, water is pumped from the faucet through a countertop water treatment system, where it may be treated by various treatment devices, such as a carbon block filter or an UV lamp. The treated water is returned to and dispensed from the faucet or from a separate treated-water spigot.

The typical household kitchen is equipped with an outlet in a cabinet beneath the sink that is controlled by a switch above the counter. These outlets are intended for use with under-the-sink garbage disposal units. Many home water treatment systems are designed to be located in a cabinet under the counter where they are hidden from sight and do not take up counter space. When water treatment systems are installed under the counter, it is common to use the garbage disposal outlet to power the water treatment system. Because it is desirable to provide constant power to the water treatment system, the switch is constantly left in the "ON" position. This method of installation requires the garbage disposal to be disconnected from the outlet. This is a problem because most consumers would prefer to have both an operational garbage disposal and water treatment system. These consumers are not pleased with the prospect of choosing between the two.

An alternative method is to install an additional outlet near the sink to power the water treatment system. In many cases, an electrician must be hired to wire the outlet at significant expense to the consumer. Even if the consumer chooses to wire the outlet himself, it is both difficult and time consuming to install the additional outlet. For this reason, many people living in homes that are not wired for garbage disposals choose not to install water treatment systems of this type.

SUMMARY OF THE INVENTION

The aforementioned problems are overcome in the present invention wherein a remote outlet and remote control are provided to control operation of the under-counter operation of a garbage disposal and a water treatment system. The remote control outlet is connected to the existing outlet and includes a receptacle that is switchable through operation of the remote control to control operation of the garbage disposal. The display unit may be battery powered or connected to a conventional AC power source such as a wall outlet.

In one embodiment, the outlet and remote control communicate using a unique code or other security mechanism to make unintended operation of the outlet from outside sources, such as a neighbor's remote control, highly improbable. The unique code may be a 64 bit or larger code that is programmed into the outlet and the remote control by the manufacturer.

The remote control may further include a visual display that permits above-counter display of status information about the water treatment system. In this embodiment, the remote control receives wireless signals from the water treatment system indicative of status, such as filter life and/or UV lamp life. The display may include indicator lights or be capable of displaying letters and numbers (e.g. a seven-segment LCD display).

In one embodiment, the system includes a microprocessor in each of the display unit and remote unit, the microprocessor in the remote unit communicating the status of the water treatment system to the display unit and the microprocessor of the display unit appropriately displaying the information. The status information is used to calculate the impending end of life of elements of the water treatment system.

The water treatment system of the present invention offers many benefits. The present invention permits a conventional switched outlet to be easily converted for use in powering both a water treatment system and a garbage disposal. The system permits the water treatment system to be hidden under the counter, while providing a remote control that is located and accessible from above the counter. In one embodiment, the present invention includes a security feature that helps to protect the outlet from unintended operation from an outside source. In one embodiment, the system includes a countertop display that permits a user to see the status of the water treatment system without going beneath the counter.

These and other objects, advantages and features of the invention will be more readily understood and appreciated by reference to the detailed description of the invention and the drawing.

DETAILED DESCRIPTION OF THE INVENTION

Figure 1:
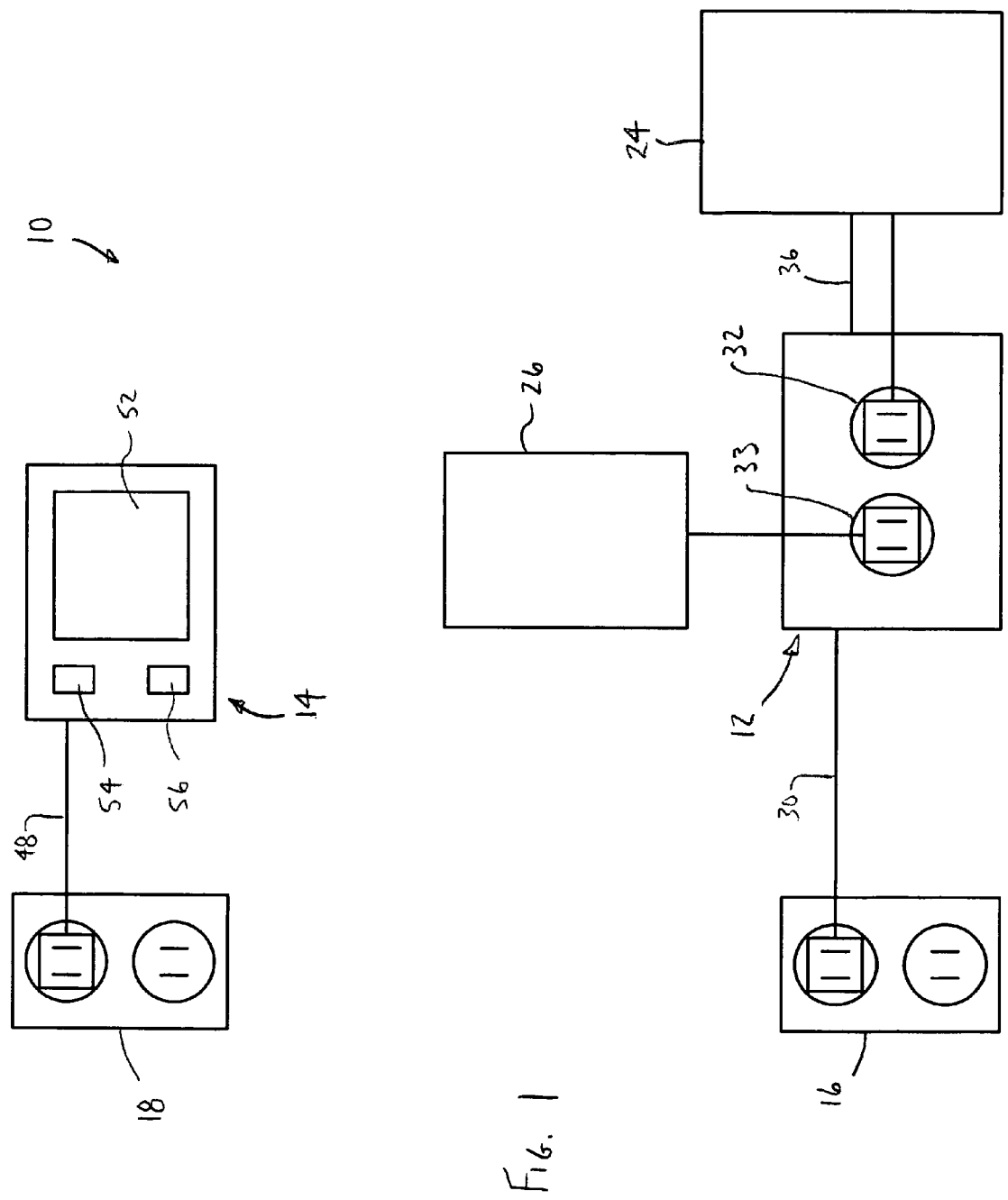
FIG. 1 is a schematic representation of a remote control system according to an embodiment of the present invention.

A remote control system 10 in accordance with a preferred embodiment of the present invention is shown in the schematic representation of FIG. 1. The system 10 generally includes a remote unit 12 having a switchable outlet and a control unit 14 for providing wireless control over the on/off status of the switchable outlet. In the illustrated embodiment, the remote unit 14 is connected to an existing AC outlet 16, such as a conventional switched, under-counter outlet intended for use with a garbage disposal. A garbage disposal 26 is connected to the switchable outlet of the remote unit 12. A water treatment system 24 is connected to a receptacle in the existing outlet or to a supplemental receptacle in the remote unit 12. The control unit 14 is located above the counter and may receive power from a conventional AC wall outlet 18. The remote unit 12 and control unit 14 communicate wirelessly to permit the control unit 14 to dictate the on/off status of the switchable receptacle.

Figure 3:
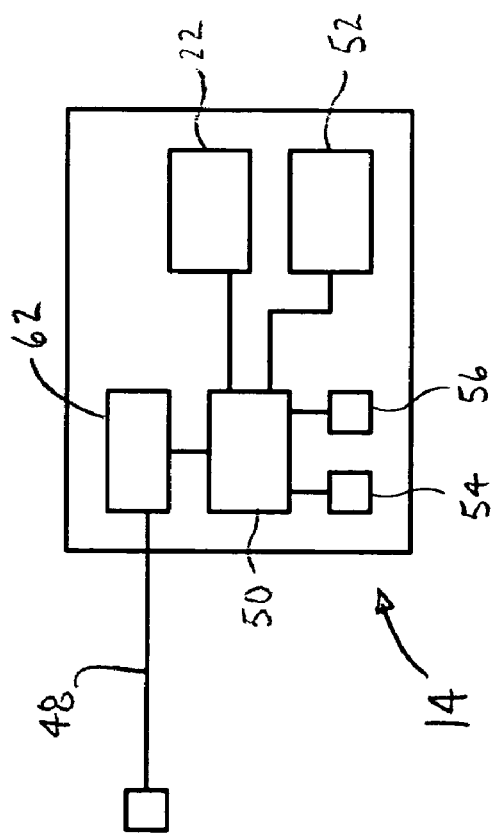
FIG. 3 is a functional block diagram of the control unit.
Figure 2:
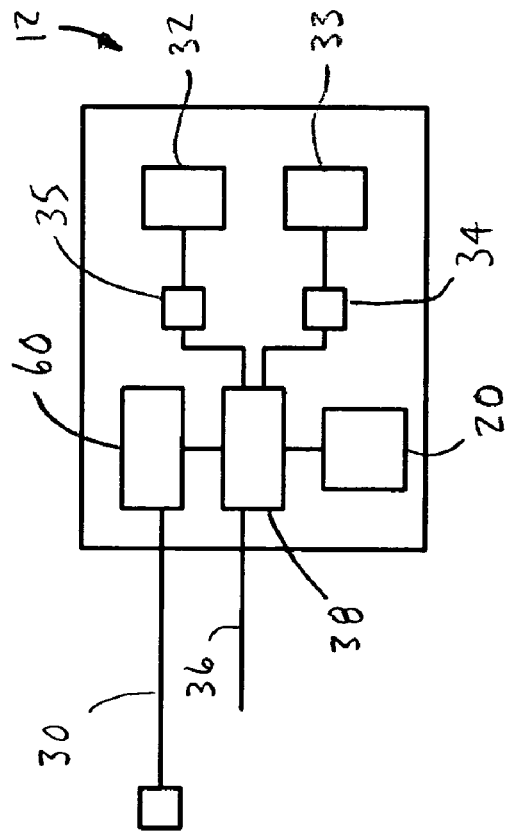
FIG. 2 is a functional block diagram of the remote unit.

The remote unit 12 and display unit 14 will now be described in greater detail with reference to FIGS. 2 and 3. In this embodiment, the remote unit 12 generally includes a power input 30, a microprocessor 38, a transceiver 20 and a pair of power outputs 32, 33. The power input 30 provides power to the remote unit 12 and may be any device connectable to an AC power source, such as a standard electrical cord or electrical plug. Many such inputs are known in the art, and any such conventional device can be used. The input 30 may be connected to any conventional AC power source, but is preferably connected to an existing switched AC outlet 16 wired for a conventional garbage disposal 26. In this embodiment, the remote unit 12 includes a power supply 60 for converting the supplied AC power to the DC power desired to power the microprocessor 38 and other digital components. The present invention is primarily, but not exclusively, intended for use with a conventional undercounter, switched garbage disposal AC outlet 16. The remote unit 12 may be a stand-alone component having a cord that extends to the AC outlet. Alternatively, the remote unit 12 may have integrated electrical prongs that permit the unit 12 to be plugged directly into the AC outlet (not shown). In this alternative embodiment, the remote unit 12 is supported by the AC outlet.

Figure 4:
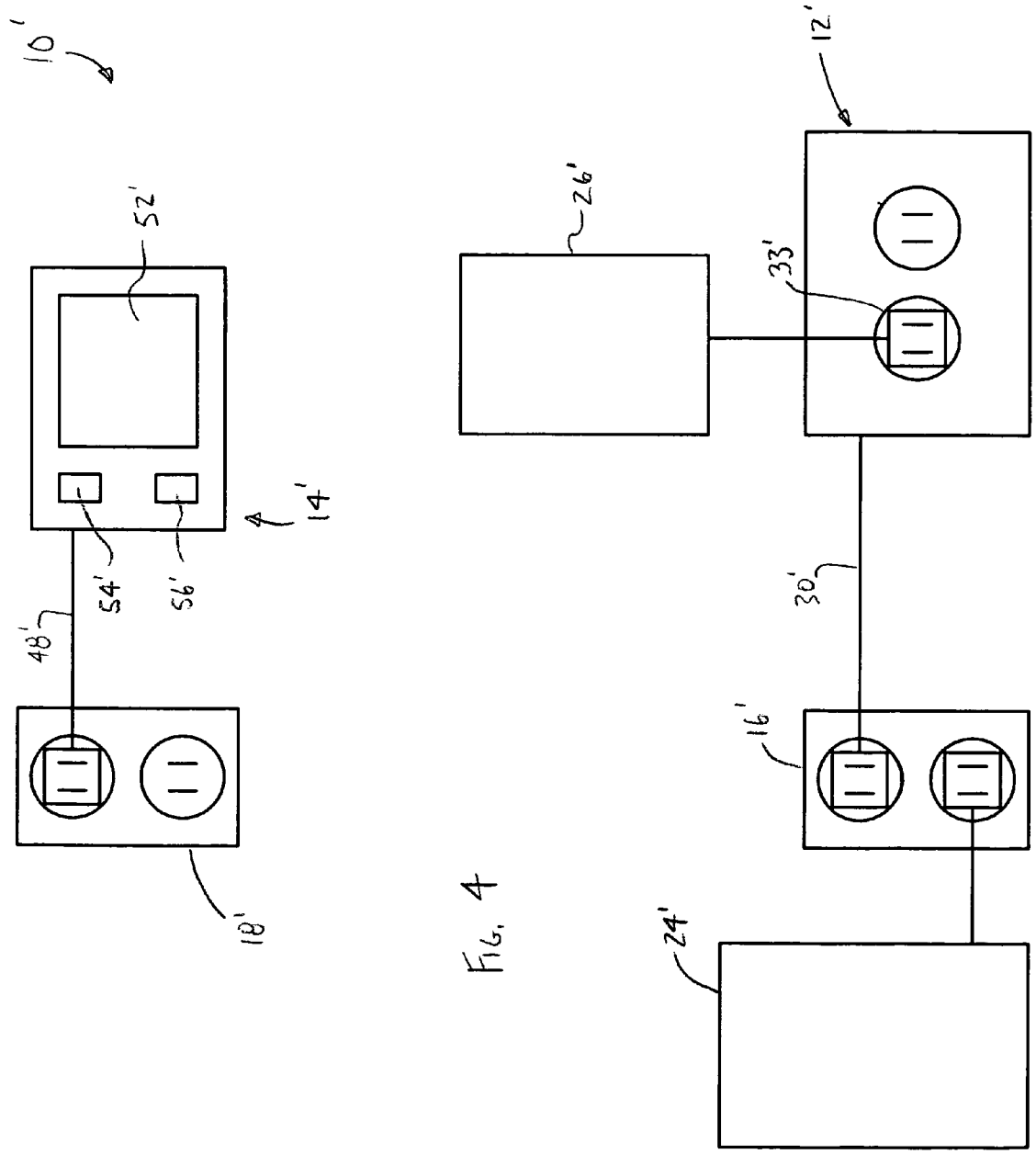
FIG. 4 is a schematic representation of an alternative remote control system according to an embodiment of the present invention.

The remote unit 12 may include one or more power outputs. As noted above, the remote unit 12 of the illustrated embodiment includes two power outputs—one power output 32 that provides power to the water treatment system 24 and a second output 33 that provides power to the garbage disposal 26. In this embodiment, the water treatment system 24 and garbage disposal 26 can be essentially any conventional systems. Although the illustrated embodiment includes two power outputs, the remote unit 12 may include essentially any desired number of switched or unswitched power outputs. If multiple switched outputs are provided, they can be switched collectively (e.g. all switches turned on and off together) or independently switched. In an alternative embodiment shown in FIG. 4, the power output for the water treatment system 24' can be eliminated (or simply not used) and the water treatment system 24' can be plugged directly into the existing AC outlet 16'. The will provide the water treatment system 24' with constant power while the preexisting above-counter wall switch remains in the "on" position. This alternative embodiment will not be described in detail, however, the components are shown in FIG. 4 with reference numerals that correspond to those in FIG. 1.

The power output 33 intended for powering the garbage disposal 26 may include a conventional AC receptacle that is connected to the power input 30 via a system switch 34. The garbage disposal 26 may be plugged directly into the AC receptacle of power output 33 in a conventional manner to selectively receive AC power. The system switch 34 is any switch capable of selectively controlling power to the power output 33, such as a typical relay or Triac. The system switch 34 permits the user to selectively turn on and off the switched power output 33 and, in turn, turn on and off the garbage disposal as will be explained in further detail below.

In the illustrated embodiment, the power output 32 intended for powering the water treatment system 24 also includes a conventional AC receptacle that is connected to the power input 30 via a system switch 35. The system switch 35 permits selective control over the power supplied to the water treatment system 24. This permits the user to turn the water treatment system 24 on and off from above the counter. In applications where the system 10 is used to monitor the status of the water treatment system 24 (as described below), this switch may be used to turn off the water treatment system 24 automatically when dictated by the status of the system 24, for example, when the life of the filter or UV bulb has expired. In an alternative embodiment, the power output 32 intended for powering the water treatment system 24 may include a conventional AC receptacle that is connected in a "pass-through" configuration to the power input 30 (i.e. without system switch 35). The water treatment system 24 can be plugged into the AC receptacle of power output 32 in a conventional manner to receive a constant source of AC power. Alternatively, the power output 32 can be a DC power output (not shown), providing the appropriate DC power to the water treatment system. In this alternative embodiment, the remote unit 12 may include a conventional power converter to convert the incoming AC power to the desired DC power output.

To provide communications with the control unit 14, the remote unit 12 may include a transceiver 20. The transceiver 20 permits that remote unit 12 to receive controls from and, in some embodiments, exchange information with the control unit 14, for example, relating to water filter status. In applications where information is not exchanged with the control unit 12, the transceiver 20 can be replaced by a receiver (not shown). The transceiver 20 may be of essentially any type of wireless transceiver, such as RF or infrared, or it may operate over wires.

In one embodiment, the remote unit 12 may provide water treatment system status information to the control unit 14, where it can be displayed above the counter and, in some applications, used to control the on/off status of the water treatment system. In this embodiment, the remote unit 12 and water treatment system 24 may be connected by a data line 36, such that the status information for the water treatment system 24 can be communicated to the remote unit 12 along data line 36. Many such data lines are well known and commonly used in the art and any such mechanisms can be used. The data line 36 is connected to the microprocessor 38 disposed in the remote unit 12. The microprocessor 38 uses the status information transmitted by the data line 36 to calculate the end of life of elements of the water treatment system 24, such as the system's filter or UV bulb. Methods of calculating these values are well known in the art and many microprocessors are available that can be programmed to perform these functions. Any such properly programmed microprocessor may be used.

The microprocessor 38 is also connected to the remote transceiver 20, such that the remote transceiver 20 can communicate information from the microprocessor 38 to the display transceiver 22 and can communicate information received from the display transceiver 22 to the microprocessor 38. Any typical transceiver capable of transmitting and receiving information wirelessly can be used for the remote transceiver 20, many of which are well known and commonly used in the art. In an alternative embodiment, typical wires are used instead of the transceivers to communicate information between the remote unit 12 and display unit 14.

In one embodiment, the remote unit 12 and control unit 14 communicate using coded signals, to make it highly improbable that the switched power output 33 will be operated on outside sources, such as a second control unit in the user's house or in a neighboring home. In this embodiment, communication signals are tagged with a unique code assigned to the unit. The code is embedded at the beginning of each communication, and may include a conventional preamble and postamble to frame the data and facilitate the desired code matching. A 64-bit or larger code is employed in the illustrated embodiment. The code may be assigned and programmed into the remote unit 12 and the control unit 14 during manufacture.

The control unit 14 of the illustrated embodiment generally includes a power input 48, a microprocessor 50, a transceiver 22, a pair of switches 54, 56 and a display 52. The power input 48 can be any device capable of providing power to the display unit 14, such as a conventional power cable. In the illustrated embodiment the power input 14 is connected to a standard AC wall outlet 18. The display unit 14 may, however, be powered by alternative sources such as batteries. In this embodiment, the control unit 14 includes a power supply 62 for converting the supplied AC power to the DC power desired to power the microprocessor 50 and other digital components.

The microprocessor 50 is connected to the control transceiver 22 and the display 52 such that information received by the control transceiver 22 can be communicated to the control microprocessor 50 and, in turn, displayed on the display 52. As with the remote transceiver, the control transceiver 22 can be any conventional transceiver capable of sending and receiving information. Additionally, the display 52 can be any display capable of displaying information concerning the water treatment system, many of which are well known and commonly used in the art. For example, the display 52 may includes one or more LEDs (or other indicators) or it may include a seven-segment LCD (or other display capable of displaying letters and numbers). In an alternative embodiment, the water treatment system 24 includes a transmitter (not shown) capable of transmitting status information directly to the control unit 14. In this alternative embodiment, the water treatment system 24 is not required to communicate with the remote unit 12 and the data line 36 may be eliminated.

The control unit 14 further includes a user-operated water treatment switch 54 and a user-operated disposal switch 56. Each of the water treatment switch 54 and the disposal switch 56 can be any device capable of accepting user input regarding power to the water treatment system 24 and the garbage disposal 26, respectively. The switches 54 and 56 are connected to the control microprocessor 50. The control microprocessor 50 is programmed to accept input signals from the switches 54 and 56 and to send control signals to the control transceiver 22 to toggle the on/off status of the water treatment system 24 or garbage disposal 26. For example, a button may be used for each switch 54 and 56, the button signaling the control microprocessor 50 to cause the transceiver to send signals to activate the water treatment system 24 or the garbage disposal 26 if the device is not in operation or to shut off power to the water treatment system 24 or disposal 26 if the device is in operation.

II. Installation and Operation

The illustrated embodiment of the present invention is easily installed in an environment with an existing garbage disposal that is controlled by an above-counter switch. The garbage disposal 26 is unplugged from the existing under-counter AC outlet. The remote unit 12 is then plugged into the existing under-counter AC outlet and the garbage disposal 26 is plugged into power output 32 in the remote unit 12. The water treatment system 24 is then placed beneath the counter and plugged into power output 33 in the remote unit 12. The preexisting wall switch is moved into the "on" position. The control unit 14 is then placed in the desired location, likely above the counter. In some applications, the control unit 14 is plugged into an existing AC outlet. In other applications, the control unit 14 is powered by batteries and therefore does not need to be plugged into an AC outlet.

To use the remote control system 10, assuming both the water treatment system 24 and disposal 26 are not in operation, the user triggers either or both of the system input switch 54 and the disposal input switch 56 to activate either or both of the system 24 or disposal 26. The system input switch 54 and/or disposal input switch 56 then signals to the microprocessor 50 that the appropriate device should be activated. The microprocessor 50 communicates this information to the transceiver 22. The transceiver 22 sends appropriate wireless signals that are tagged with the unique code. The signals are received by the transceiver 20 of the remote unit 12. The microprocessor 38 of the remote unit 12 parses the received signals to ensure that they are tagged with the correct code. If not, the signals are ignored. If the signals include the correct code, they are processed by the microprocessor 38. The microprocessor 38 then actuates either or both of the system switch 34 and disposal switch 35 to supply power to the water treatment system 24 or disposal 26, respectively. To deactivate either of the devices, the user activates the appropriate switch on the display unit 14 and the same process is performed.

As noted above, the control unit 14 includes a display 52 for displaying status information for the water treatment system 24. In operation, the water treatment system 24 transmits status information to the remote unit 12 via data line 36. The remote microprocessor 38 receives the signals and performs any signal processing that may be necessary. The remote microprocessor 38 then causes the remote transceiver 20 to transmit signals indicative of the status information received from the water treatment system 24. The signals are tagged with the unique code. The signals are received by the control unit 14. More specifically, the control transceiver 22 receives the signals and transmits them to the control microprocessor 50. The control microprocessor 50 ignores the signals if they do not include the correct code. If they do, the control microprocessor 50 performs any necessary processing of the signals and then sends appropriate controls signals to the display 52 to display the status information. The display provides a visual indication of the status of the water treatment system, such as on/off status and end-of-life information for the UV bulb and particulate filter. In an alternative embodiment, simple indicator lights can be provided to give a visual indication when the water treatment system is on or when the UV bulb or particulate filter has reached the end of its life. In this embodiment, the water treatment system 24 may send an appropriate signal once the UV bulb or filter has reached the end of its life. The remote unit 12 may transmit a corresponding signal to the control unit 14, where the appropriate indicator is illuminated. In this alternative embodiment, the system is not required to process numerical data or to display more complicated status information.

The above description is that of a preferred embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The invention claimed is:

1. A remotely controllable under-counter water treatment and garbage disposal system comprising:
    an under-counter water treatment system with an electrical plug;
    an under-counter unswitched garbage disposal with an AC power electrical plug;
    an under-counter remote unit with an AC power electrical plug connectable to an under-counter switched AC power wall outlet, said remote unit having at least two AC power outlets, said electrical plug of said under-counter water treatment system and said under-counter unswitched garbage disposal each electrically plugged into one of said AC power outlets of said under-counter remote unit, said under-counter remote unit controlling power to said under-counter water treatment system and said under-counter unswitched garbage disposal, said under-counter remote unit including a receiver;
    an above-counter wall switch electrically coupled to said under-counter switched AC power wall outlet, wherein said above-counter wall switch operates to selectively provide power to said under-counter switched AC power wall outlet; and
    an above-counter control unit having an electrical plug connectable to an above-counter AC power wall outlet, said above-counter control unit having a transmitter for transmitting power control signals to said under-counter remote unit, said signals being tagged with a code unique to a corresponding pair of said under-counter remote unit and said above-counter control unit, whereby said under-counter remote unit controls the supply of power to said under-counter water treatment system and said under-counter unswitched garbage disposal only when signals with said code are received.

2. The water treatment system of claim 1 wherein said above-counter control unit includes a first input, said input capable of receiving user input regarding supply of power to said under-counter water treatment system.

3. The water treatment system of claim 2 wherein said under-counter remote unit includes a microprocessor and a data line interconnecting said microprocessor and said water treatment system such that information may be transmit by said under-counter water treatment system to said microprocessor.

4. The water treatment system of claim 3 wherein said above-counter control unit includes a second input capable of receiving user input regarding power to the under-counter unswitched garbage disposal system.

5. The water treatment system of claim 4 wherein said under-counter remote unit includes a first switch for controlling power to said under-counter water treatment system.

6. The water treatment system of claim 5 wherein said under-counter remote unit includes a second switch for controlling power to said under-counter unswitched garbage disposal.

7. The water treatment system of claim 6 wherein said above-counter control unit includes a display for displaying information indicative of the status of said under-counter water treatment system, said receiver of said under-counter remote unit being further defined as a transceiver capable of transmitting water treatment system status information to said above-counter control unit, said transmitter of said above-counter control unit being further defined as a transceiver capable of receiving water treatment system status information from said under-counter remote unit.

8. A remotely controllable under-counter water treatment and garbage disposal system comprising:
    an under-counter water treatment system with an electrical plug;
    an under-counter unswitched garbage disposal system with an electrical plug;
    an under-counter remote unit with an AC electrical plug connectable to an under-counter switched AC power wall outlet and having a first power output including an AC power outlet, said electrical plug of said under-counter unswitched garbage disposal system being connected to said first power output, said under-counter remote unit having a switch for selectively controlling supply of power to said under-counter unswitched garbage disposal system via said power output, said under-counter remote unit having a second power output including an AC power outlet, said electrical plug of said under-counter water treatment system being electrically connected to said second power output;
    an above-counter wall switch electrically coupled to said under-counter switched AC power wall outlet, wherein said above-counter wall switch operates to selectively provide power to said under-counter switched AC power wall outlet; and
    an above-counter control unit having an electrical plug connectable to an above-counter AC power wall outlet, said above-counter control unit having a first input capable of receiving user input regarding supply of power to said under-counter unswitched garbage disposal system, said above-counter control unit further including a transmitter for transmitting information to said under-counter remote unit to control the status of said switch in response to user input received via said input, whereby the user controls on/off status of said under-counter unswitched garbage disposal system by operation of said input at said above-counter control unit.

9. The system of claim 8 wherein said above-counter control unit includes a means for tagging signals transmitted by said above-counter control unit to said under-counter remote unit with a unique code and said under-counter remote unit includes a means for affecting status of said switch only in response to signals tagged with said unique code.

10. The system of claim 9 wherein said under-counter control unit includes a display for displaying information regarding a status of said under-counter water treatment system.

11. The system of claim 10 wherein said receiver of said under-counter remote unit is further defined as a transceiver and said transmitter of said above-counter control unit is further defined as a transceiver, said transceiver of said undercounter remote unit capable of transmitting water treatment status information to said transceiver.

12. The system of claim 11 wherein said under-counter remote unit includes a microprocessor and a data line interconnecting said microprocessor and said under-counter water treatment system, whereby said microprocessor may receive status information from said under-counter water treatment system.

13. The system of claim 8 wherein said above-counter control unit includes a second input capable of receiving user input regarding supply of power to said under-counter water treatment system; and
    said under-counter remote unit includes a second switch for controlling power to said under-counter water treatment system independently of said first switch.

14. A water treatment and garbage disposal control system comprising:

an above-counter control unit having a disposal input, a treatment input, a display and a transceiver, said transceiver capable of transmitting signals in response to actuation of said disposal input and said treatment input, said transceiver capable of receiving information indicative of the status of an under-counter water treatment system, said display displaying information concerning a status of said under-counter water treatment system;

an under-counter remote unit with an electrical plug connectable to an under-counter switched AC power wall outlet, said under-counter remote unit having a disposal power output and a treatment power output, both of said outputs including AC power outlets, and a transceiver, said transceiver capable of receiving signals transmitted by said above-ground control unit, said under-counter remote unit having a disposal switch for toggling supply of power to said disposal output in response to signals received from said above-counter control unit and a treatment switch for toggling supply of power to said treatment output in response to signals received from said above-ground control unit;

an above-counter wall switch electrically coupled to said under-counter switched AC power wall outlet, wherein said above-counter wall switch operates to selectively provide power to said under-counter switched AC power wall outlet;

an under-counter water treatment system having an electrical plug electrically connected to said treatment power output of said under-counter remote unit; and an under-counter unswitched garbage disposal having an electrical plug electrically connected to said disposal power output of said under-counter remote unit.

15. The system of claim 14 wherein said above-counter control unit includes a means for tagging signals transmitted by said above-counter control unit to said under-counter remote unit with a unique code and said under-counter remote unit includes a means for affecting status of said switch only in response to signals tagged with said unique code.

16. The system of claim 15 further comprising a data line interconnecting said remote unit and said water treatment system, wherein said remote unit is capable of receiving water treatment system status information from said under-counter water treatment system.

17. The system of claim 15 wherein said under-counter water treatment system includes a transmitter for transmitting water treatment system status information to said above-counter control unit.

* * * * *